United States Patent [19]
Dotterweich

[11] 3,741,588
[45] June 26, 1973

[54] TRAILER HITCH

[75] Inventor: William E. Dotterweich, East Lansing, Mich.

[73] Assignee: Foote Products, Valley Tow-Rite Division, The Scot and Fetzer Company, Lansing, Mich.

[22] Filed: Feb. 14, 1972

[21] Appl. No.: 226,122

[52] U.S. Cl. .............. 280/491 E, 280/495, 280/502
[51] Int. Cl. ............................................. B60d 1/06
[58] Field of Search .................. 280/491 R, 491 E, 280/495, 502

[56] References Cited
UNITED STATES PATENTS

| 2,554,711 | 5/1951 | Lowman | 280/495 |
| 2,595,711 | 5/1952 | Schwork | 280/502 |
| 2,622,892 | 12/1952 | Lowman | 280/495 |
| 2,815,964 | 12/1957 | Brown | 280/495 |
| 2,877,025 | 3/1959 | Jay | 280/495 |

FOREIGN PATENTS OR APPLICATIONS

| 500,110 | 12/1919 | France | 280/491 E |

*Primary Examiner*—Leo Friaglia
*Attorney*—Winston E. Miller, William J. Morriss et al.

[57] ABSTRACT

A trailer hitch comprising a pair of parallel horizontal plates, each having curvilinear projections therefrom and the projections penetrating selected openings provided in an attachment surface, such as a vehicle bumper or extension from the frame, transverse to the horizontal plates. The projections are tilted into the openings to bear on the opposite side of the web of the bumper or frame extension from the plates. Thus the horizontal plates are positioned in relative parallel spaced registry relation. The trailer ball serves as a stud and extends through both registering plates and upon tightening partially closes the space between the plates and secures the hitch in compression relation relative to the attachment surface such as the bumper or frame extension.

5 Claims, 6 Drawing Figures

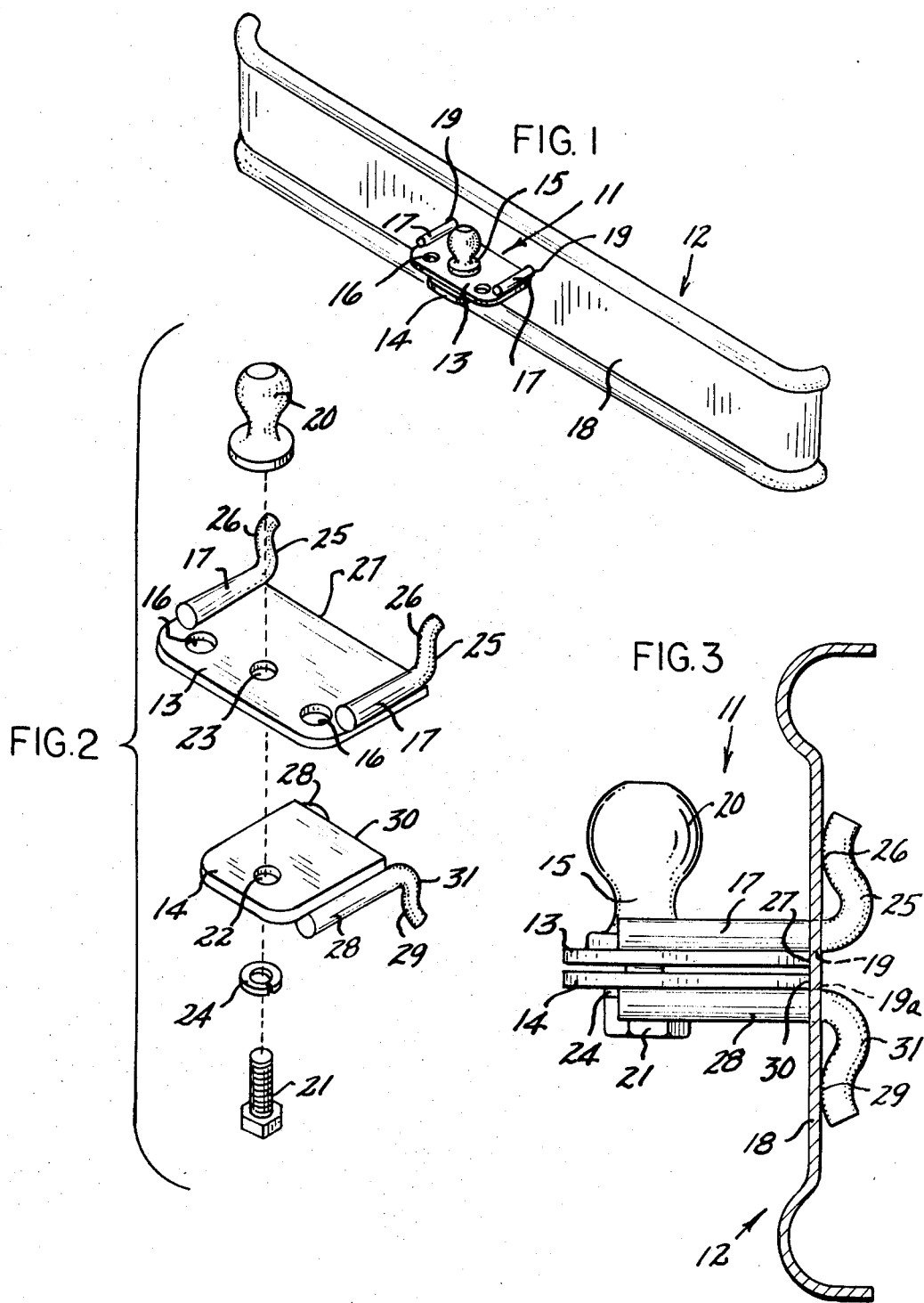

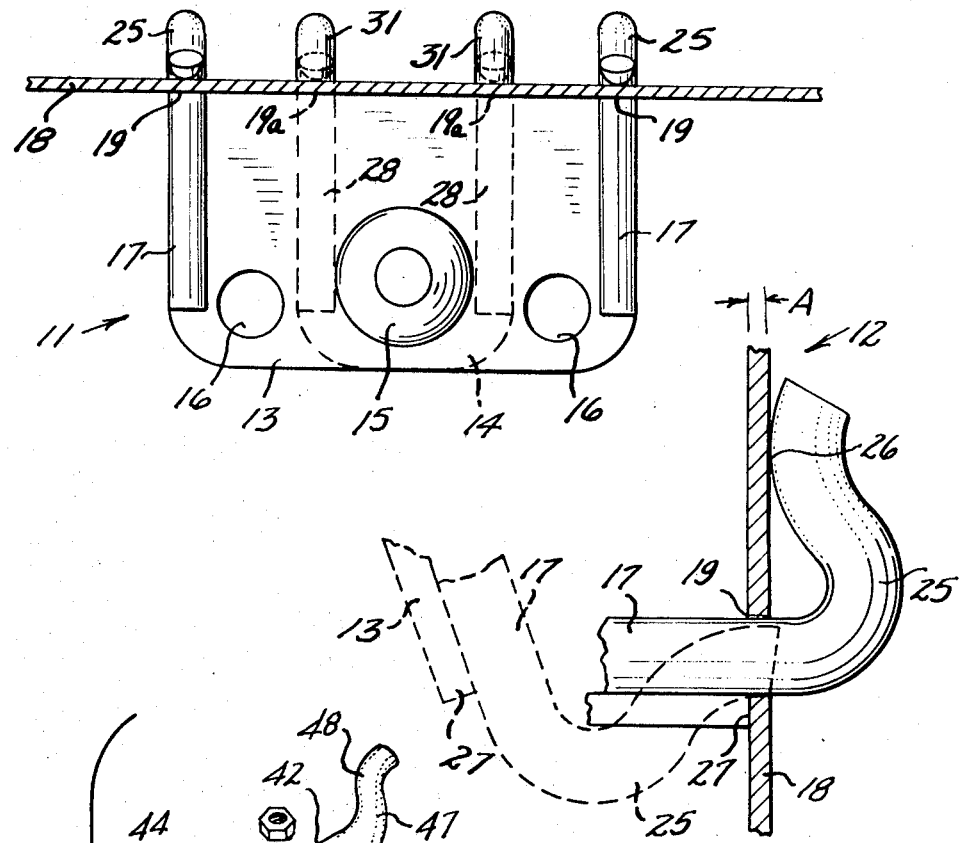
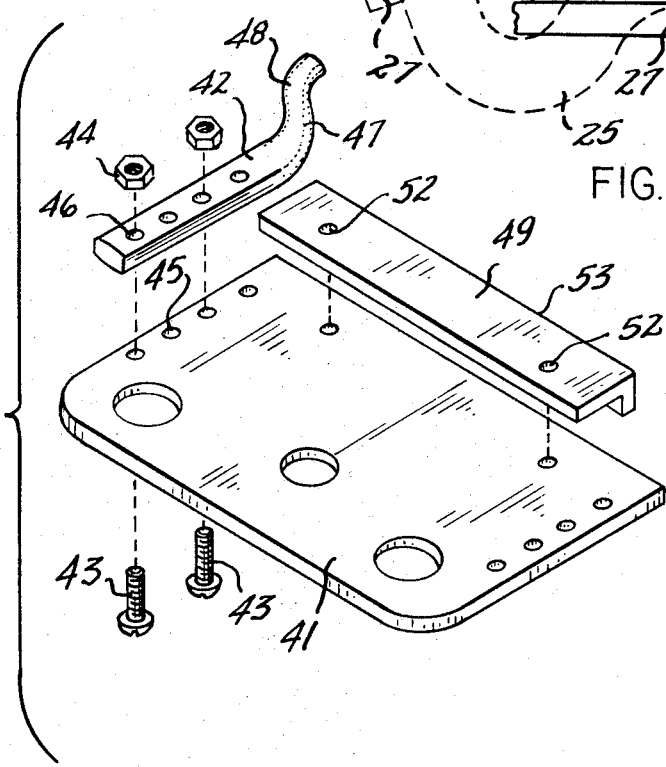

TRAILER HITCH

The present invention is an improved trailer hitch and more particularly an assemblage of simple parts to accomplish an easily removable trailer hitch for a reinforced vehicle bumper or frame extension.

Most trailer hitches have sought connection as by welding or by connection to and extension from a vehicle frame. The present hitch utilizes a unique combination of plates and curvilinear protuberances to interlock the plates with a vehicle bumper or bumper mounted vertical plate so that the hitch structure is selectively removable, is easy to install and as strongly supportive of a trailer as the vehicle bumper or frame extension.

The invention looks toward the provision of a trailer hitch useful with new heavier bumpers as are likely to be required in automotive safety regulations and which hitch can be removed when not in use by the mere application or removal of the ball element.

THE PRIOR ART

While hitch devices applied to vehicles for attachment of trailers are well known, there appear to be no others who have attempted to provide a hitch supported by curvalinear protuberances from plates which protuberances are extended through openings in a bumper or frame extension and where the horizontally referenced plates are in vertical face to face registry and are urged toward each other by the fastening of the plates as by the ball stud. The closest known suggestion of the mounting provisions are found in U.S. letters Pat. No. 1,211,992 to Winter; U.S. letters Pat. No. 2,595,711 to Schwork; and U.S. letters Pat. No. 2,312,985 to Bales. These references fail to show adjacent face to face parallel plates in support of a trailer hitch ball and connected to the vehicle through selected openings in the vehicle bumper or frame extensions.

Accordingly, a principal object of the present invention is to provide a new and useful quickly dismountable trailer hitch which is assembled through a bumper or other frame extension.

Another object is to provide a trailer hitch from three parts related together by a wall such as the hub of a vehicle bumper. These are a pair of horizontal plates each having spaced apart protuberances extending therefrom and plates which are assembled in parallel spaced apart juxtaposed registry. The bumper frame mounting means through which the protuberance extends and against which the plates bear on one side and the protuberances bear on the other, and clamp means urging the two plates towards each other and in tight clamping relation against the mounting means.

Still another object is to provide a durable bumper mounted trailer hitch which is simple to construct and easy to install.

Other objects, including economy and safety will be increasingly apparent as the description proceeds.

GENERAL DESCRIPTION

In general, the trailer hitch of the present invention comprises an upper and a lower support plate, both having rearwardly extending S-shaped curvilinear protuberances. These curvalinear portions extend transversely of the plates to which they are secured. The serpentine character of these protruding extensions are such that they may be tilted into and through a web or wall substantially transverse to the planes of the plates so that the rear edges of the plates bear upon the wall on one side and the curvilinear protuberances bear against the wall on the other side. At this point of contact in both plates, the upper and lower plate are in spaced apart parallel face to face registry. This permits the use of a ball hitch stud or other clamping means for urging the two plates toward each other. The more tightly the stud is attached, the tighter the compression between plates and protuberances on the wall. The wall is a web or vertical portion of the bumper of a vehicle and the plates are different in size so that the openings through the wall are not clustered to overly weaken the wall. The plates are easily detached by unfastening the hitch ball stud and tilting the protuberances out of their openings thereby leaving the bumper wholly uncluttered. The spacing, as will be seen, may be adjusted for variant wall thicknesses and configurations. While such devices were frowned upon when bumpers were insubstantial, the present safety requirements urging stronger and more structurally integrated bumpers provide a basis of excellent use of the present hitch and when the present hitch is dismounted the bumper is left uncluttered by any extension therefrom.

IN THE DRAWINGS

FIG. 1 is a perspective view of a trailer hitch in accord with the present invention secured to a vehicle bumper.

FIG. 2 is a composite exploded perspective view of a trailer hitch, the hitch elements of the present invention and indicating the extreme simplicity of the structure.

FIG. 3 is a side elevation view of the trailer hitch of the present invention installed through a vertical bumper plate.

FIG. 4 is a top plan view of the structure seen in FIG. 3 and indicating the relative disposition of the upper and lower plates in registry relationship by the hitch ball and stud element.

FIG. 5 is an exploded perspective view of a modified structure in accord with the present invention and indicating the variable displacement of the plates by adjustment of the protuberances and use of a filler buttress.

FIG. 6 is an elevation view as in FIG. 3 but showing the tilt-in technique in phantom line extending the protuberances into and through the vertical plate.

SPECIFIC DESCRIPTION

Referring to the drawings and in particular to the FIG. 1 thereof, the trailer hitch 11 of the present invention is shown secured to the bumper 12 which is a reinforced extension of a vehicle frame. The trailer hitch 11 includes an upper plate 13 and lower plate 14 held together with the ball stud 15, the ball portion of which extends upwardly for engagement with a corresponding connector element on a tow bar of a trailer, for example. Openings 16 formed through the upper plate 13 provide safety chain support link connections. The rods 17 welded to the upper surface of the upper plate 13 are seen to extend into and through the web portion 18 of the bumper 12 through the openings 19. The bumper 12 is considerably stronger than most bumpers now in common vehicular use and is in accord with safety requirements seeking added strength and resistance to substantial damage of vehicles.

FIG. 2 shows the interrelationship of the elements shown assembled in the FIGS. 1 and 3. The ball stud 15 is seen as separable so that the ball 20 is threadably detachable from the stud 21 and it is seen that the stud 21 extends upward through the openings 22 in the plate 14 and 23 in the plate 13 for threadable connection to the ball element 20. The lock washer 24 resists vibrational disconnect as between the stud 21 and plates 14, 13 and ball 20. The registry as between the plates 13 and 14 is for parallelity and precise registry of the stud openings 22 and 23. The rods 17 in the plate 13 extend rearwardly therefrom in a rising vertical serpentine or S curve 25 in respect to the horizontal of the plate 13 as shown. The curvature is such as to place the contact surface 26 in horizontal displacement from the back edge 27 of the upper plate 13, an amount which will be seen to substantially equal the thickness of the web 18 of the bumper 12. The lower plate 14 can also be seen to include parallel rearwardly extending curvilinear rods 21 which extend rearwardly and curve vertically downwardly in a serpentine or S curve configuration. Here, as in the plate 13, the contact surfaces 29 are displaced horizontally from the rear edge 30 of the plate 14 by a distance substantially equal to the thickness of the bumper 12. Accordingly, the curvilinear protuberances 25 and 31 in the upper and lower plates 13 and 14, respectively, cooperate with the rear edges 27 and 31 of the plates 13 and 14, respectively, to assure substantial spaced apart face to face parallelity as between the two plates 13 and 14 when assembled by insertion of the protuberances 25 and 31 through the openings 19 and 19a spaced through the bumper 12 to receive the protuberances 25 and 31 in a tilt-in manner. The vertical spacing interval as between openings 19 and 19a establish the space interval between the plates 13 and 14. While the plates 13 and 14 may be cast or forged to provide the selected protuberances 25 and 31, respectively, the structure illustrated shows rod stock formed as desired in the mating serpentine configurations and then welded, brazed or otherwise attached to the upper surface of the upper plate 13 and the lower surface of the lower plate 14, as shown.

In the FIG. 3, the assemblage of FIG. 2 is placed in appropriate tilt-in relation through the bumper 12 and the plates 13 and 14 are thereupon placed in parallel opposed face to face relation and in registry for clamping by the stud 21 and internally threaded ball 20. Tightening of the stud ball 15 relationship will urge the two plates 13 and 14 closer together and tightens the grip of surfaces 26 and 29 and edges 27 and 30 against the web 18 in a most secure manner.

By reference to FIG. 4, the plate 13 superposed over the plate 14 is best seen and the spacing of the protuberances 25 and 31 are best understood in spaced relation vertically (FIG. 3) and horizontally to avoid weakening the web 18 at the point of the openings 19 and 19a.

In FIG. 6 the tilt-in of the plate 13 is shown to illustrate the simple assembly and disassembly of the trailer hitch of the present invention connected through the opening 19 in the web 18 of bumper 12 and firmly bearing at point 26 and at the edge 27 against the web 18 and secured solidly and in compression relation on the bumper 12 by the single clamp element of ball stud 15, as in FIG. 3. The phantom line structure shows the protuberance 25 moving through the opening 19 and following the serpentine tilt-in the final position is shown in solid lines bearing on the web 18 on both sides with the plate 14 finally transverse to the plane of the web 18 and with the edge 27 displaced from the contact point 26, the distance A, substantially equal to the web thickness. The lower plate 14 will be understood to be similarly and oppositely tilted into position as seen in FIG. 3.

The structure seen in FIG. 5 is modified from the previously described structure to illustrate an adjustable form of the structure to accommodate a variety of thicknesses A as from one vehicle to another and to conform to curvilinear forms of web in a particular bumper. While only the upper plate 41 is shown, the lower plate can be similarly but oppositely arranged. The rod elements 42 are adjustable by selecting openings 45 for the fasteners 43 and nuts 44 in the bank of openings 46 for selected registry. This adjusts the relative amount of projection of the protuberance 47 and in particular, locates the contact surface 48 which, upon assembly, engages the web of the bumper on the back side or vehicle side of the bumper. Then by selecting an insert 49, which is a spacer, additional dimensional control may be added to accommodate a selected webbing thickness A (as in FIG. 6) or a displacement equal to webbing thickness plus curvature so that on assembly, the plate 41 projects horizontally in spaced face to face parallelity with the lower plate, similarly provided. Both or either of the adjustments indicated are useful for modifying the trailer hitches of this invention to particular bumper or vehicular situations. The stud opening 50 is understood as being in register with a corresponding opening in the lower plate to receive the ball stud clamp as in previously described structures. The openings 52 indicate the use of rivets or other fasteners for the spacer element 49 but brazing or welding is also useful in some instances and the entire object of the L-shaped spacer is to selectively locate the rear edge 53 for contact against the outboard side of the bumper web.

In operation, the presently described trailer hitches perform well and are easily taken on and off in a matter of minutes. As changes occur in the strengthening of the bumpers, it is expected that hitches as disclosed herein will prove most helpful and will be interchangeable as between different vehicles.

Having thus described my invention and at least one operative embodiment thereof, others skilled in the art will readily appreciate improvements and modifications therein and such improvements and modifications are intended to be included herein limited only by the scope of the hereinafter appended claims.

I claim:

1. A trailer hitch comprising:
    a pair of horizontal plates and each having a pair of curvilinear projections of a configuration to pass through registering openings in a substantially vertical wall of a bumper;
    a bumper element having a vertical wall portion and openings therethrough and through which said projections of said plates may be selectively passed so that said plates are supported by said bumper wall in a parallel relation; and
    a hitch stud passing through both of said plates in parallel register each with the other and compressing said projections and said plates against said vertical wall.

2. The trailer hitch of claim 1 wherein the horizontal plates have serpentine curvilinear projections which extend rearwardly and transversely of the plane of said plates.

3. The trailer hitch of claim 1 wherein the contact point of said curvilinear projection with said wall and said plates at contact with said wall is equal to the thickness of said wall whereby said plates project horizontally from said wall in spaced apart parallel relation.

4. A quickly dismountable trailer hitch of the ball type secured in position by a single fastener comprising:
   an upper horizontal plate having a projecting portion therefrom and a rear edge;
   a lower horizontal plate having a projecting portion therefrom and a rear edge, said lower plate being positioned in opposed spaced apart registry with said upper plate and said projections curved transversely from said plates;
   a substantial vertical wall having openings therethrough and through which said projections extend and said projections bear against said wall when said plates are in spaced parallel face to face relation engaging the other side of said wall; and
   a ball stud element extending upwardly through said plates and securing said plates in compression relation to each other and said wall.

5. A ball type trailer hitch comprising:
   an upper horizontal support plate and including curvilinear projections extending from one side of said upper plate and transversely upwardly on a gentle S curve of serpentine configuration;
   a lower horizontal support plate positioned in substantially parallel spaced register with said upper plate and said lower plate including a plurality of curvilinear projections extending from one side of said lower plate and downwardly in a gentle S curve configuration;
   a substantially vertical support wall having openings therethrough in registry with said projections and against which the said upper and lower plates bear on one side and said curvilinear projections bear on the other when said plates are in parallel horizontal relation; and
   a ball hitch stud element in clamping relation through said upper and lower support plates which upon tightening urges said plates toward each other and the consequent tilt thereof urging said projections into tight bias relation against said vertical support wall.

* * * * *